United States Patent Office 3,139,429
Patented June 30, 1964

3,139,429
VAT DYESTUFFS OF THE DIBENZANTHRONE SERIES
Kurt Weber, Basel, Switzerland, assignor to Ciba Limited, Basel, Switzerland, a company of Switzerland
No Drawing. Filed Oct. 10, 1961, Ser. No. 144,064
Claims priority, application Switzerland Oct. 14, 1960
6 Claims. (Cl. 260—247.1)

This invention provides valuable vat dyestuffs of the dibenzanthrone series which are free from acid groups imparting solubility in water and contain at least one sulfonamide group derived from a secondary amine.

The invention also provides a process for the manufacture of the above dyestuffs, wherein a dibenzanthrone which is free from acid groups imparting solubility in water, such as sulfonic acid groups or thiosulfato groups, and contains at least one acid halide group, is condensed with a secondary amine.

The term "dibenzanthrones" is used herein, where the context permits, to include dibenzanthrone and also isodibenzanthrone and substitution products of these compounds. There are advantageously used as starting materials the disulphochlorides. The disulphochlorides can be obtained by heating a dibenzanthrone with chlorosulfonic acid, or by treating a dibenzanthrone disulfonic acid with an acid-halogenating agent, for example, phosphrous pentachloride or thionyl chloride, in the presence of a dialkyl-formamide. Apart from the halogensulfonic acid groups, the dibenzanthrones may also contain other substituents not imparting solubility in water, such as, for example, as halogen atoms or alkoxy groups.

The secondary amines used in the process are, for example, N-alkyl-N-alkyl-, N-alkyl-N-cycloalkyl-, N-alkyl-N-aryl- or N-alkyl-N-aralkyl-amines, and especially amines of the formula

in which $R_1$ represents an alkyl or hydroxyalkyl group, and $R_2$ represents an alkyl, hydroxyalkyl or phenyl group, or in which $R_1$ and $R_2$ together with the nitrogen atom constitute a heterocyclic ring.

$R_1$ and $R_2$, for example, may be lower alkyl groups, especially alkyl groups containing 1 to 4 carbon atoms, such as the methyl, ethyl, propyl, isopropyl or butyl groups, or lower hydroxyalkyl groups, such as the β-hydroxyethyl group or the β-hydroxypropyl group, or lower alkoxyalkyl groups, such as the β-methoxyethyl group, or the β-cyanethyl group.

As examples of heterocyclic secondary amines there may be mentioned pyrrolidine, and especially amines of the formula

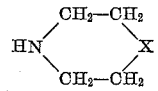

in which X represents a direct bond, an oxygen or sulfur atom or one of the groups —$CH_2$—, >$CH$—$CH_3$, >$N$—$CH_3$ and >$SO_2$.

The reaction with the dibenzanthrone sulfonic acid halide may be carried out, for example, in an inorganic solvent, such as nitrobenzene, or an alkylene chloride or pyridine, or in an excess of the dialkylamine used for the reaction, but is preferably carried out in aqueous suspension. In order to avoid hydrolysis of the sulfonic acid halide group, the condensation is advantageously carried out at a comparatively low temperature, for example, at a temperature within the range of 0° C. to 80° C. Advantageously, at least one molecular proportion of the secondary amine is used for each sulfonic acid halide group.

The new dibenzanthrones of the invention contain at least one, and preferably two, sulfonamide groups derived from secondary amines. They are valuable vat dyestuffs which are useful for dyeing and printing a very wide variety of materials, especially cellulose fibres. They yield blue to violet dyeings having good properties of fastness, especially to light, washing and chlorine, and in certain cases they are distinguished by their good fastness to water drops and to ironing.

As compared with dibenzanthrones that do not contain sulfonamide groups, the dyestuffs of the present invention are distinguished by the fact that they yield clear dyeings shifted towards blue, and that they can be used for dyeing not only at high temperatures, but also at medium temperatures.

The following examples illustrate the invention, the parts and percentages being by weight:

*Example 1*

11.4 parts of isodibenzanthrone are dissolved in 210 pairs of chlorosulfonic acid at 20 to 25° C. The solution is stirred for 4 hours at 60 to 65° C. It is then cautiously poured on to ice, and the precipitate is filtered and washed with ice-water. 500 parts of an aqueous solution of dimethylamine of 40% strength are added to a suspension of the sulfochloride in 400 parts of ice-water, and the whole is stirred for 2 hours at 0 to 5° C., then for 20 hours at room temperature and finally for one hour at 60 to 70° C. The mixture is then filtered, while hot, and the filter residue is washed neutral with hot water.

The new dyestuff has the probable formula:

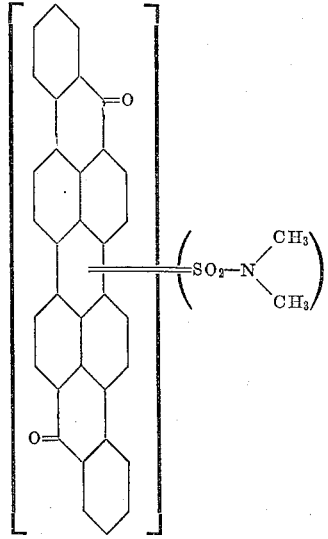

It dyes cellulose fibres from a vat violet tints having excellent properties of fastness to light and moisture.

By using the same amount of dibenzanthrone, instead of isodibenzanthrone, and otherwise proceeding in the manner described in the first paragraph of this example, a dyestuff is obtained that has the probable formula:

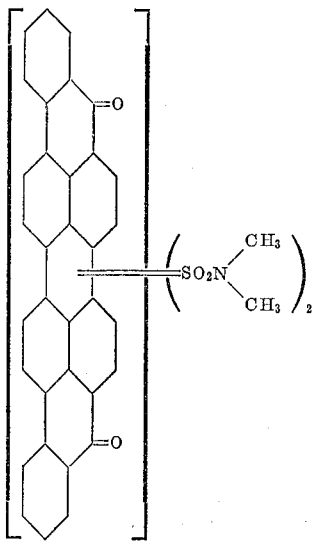

and that dyes cellulose fibres from a vat with navy blue tints having an excellent fastness to light and excellent properties of wet fastness.

*Example 2*

11.4 parts of isodibenzanthrone are dissolved in 210 parts of chlorosulfonic acid at 20 to 25° C. The solution is stirred for 4 hours at 80 to 85° C. It is then cautiously poured on to ice, and the precipitated sulfochloride is filtered and washed with ice-water. 100 parts of morpholine are added to a suspension of the sulfochloride in 400 parts of ice-water, and the whole is stirred for 2 hours at 0 to 5° C., then for 24 hours at room temperature and finally for 3 hours at 60 to 70° C. The warm material is then filtered and washed, first with a hot aqueous solution of pyridine of 30% strength and then with hot water, and finally dried.

The new dyestuff has the probable formula

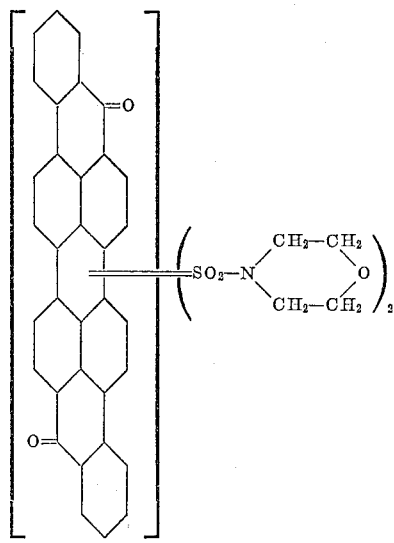

and yields from a vat strong reddish blue dyeing having excellent properties of fastness.

The same dyestuff is obtained by introducing the moist sulfochloride into a solution of 50 parts of morpholine in 500 parts of ethylene chloride at 0 to 5° C., and then continuing in the same manner as that described above.

Similar dyestuffs are obtained by using pyrrolidine or piperidine, thiomorpholine or N-methylpiperazine, instead of morpholine.

By using the same quantity of dibenzanthrone, instead of isodibenzanthrone, dyestuffs of the formulae

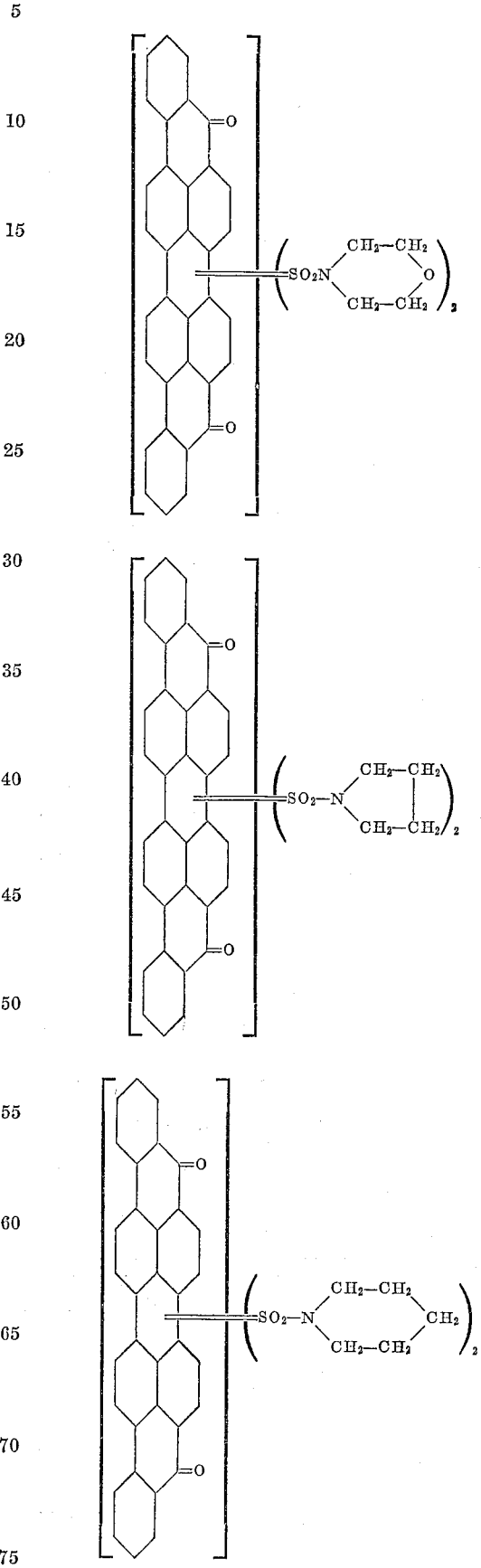

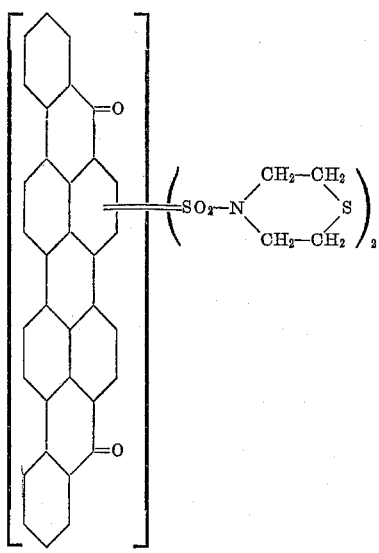

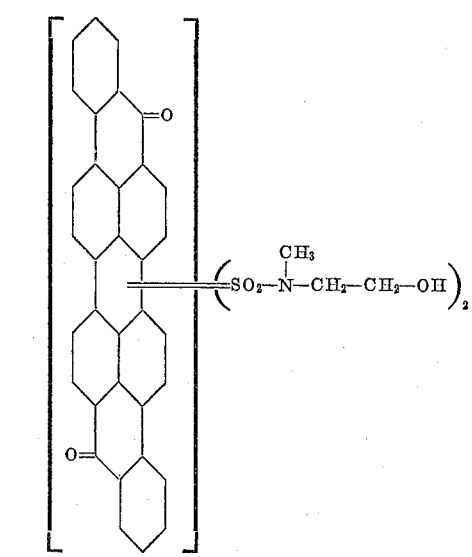

The dyestuff so obtained has the formula and dyes cotton from a vat with strong reddish blue tints having good properties of fastness.

By using 100 parts of diethanolamine, instead of 100 parts of monomethylaminoethanol, and otherwise proceeding in the manner described in paragraph 1, a dyestuff of the formula

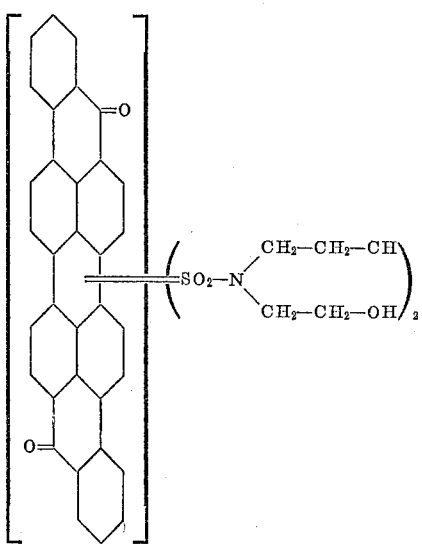

is obtained. It dyes cellulose fibres from a vat strong reddish blue tints having good properties of fastness.

By condensing with di-β-hydroxypropylamine, and

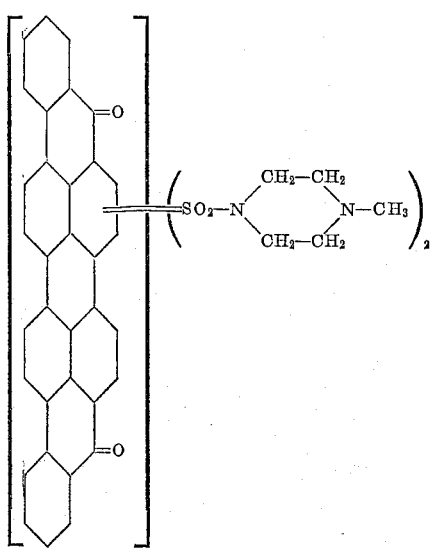

are obtained, and these dyestuffs also yield blue dyeings.

*Example 3*

11.4 parts of isodibenzanthrone are dissolved in 120 parts of chlorosulfonic acid at room temperature. The solution is stirred for 3 hours at 70° C. and then for 2 hours at 80° C. The mixture is then cautiously poured on to ice, and the precipitated sulfochloride is filtered off and washed with ice-water. 100 parts of monomethylaminoethanol are added to a suspension of the sulfochloride in 400 parts of ice-water, and the whole is stirred for two hours at 0 to 5° C., then for 15 hours at room temperature and finally for one hour at 60 to 70°. The mixture is filtered while hot, and the filter residue is washed neutral with water, and then dried.

otherwise proceeding in the same manner, a dyestuff of the formula

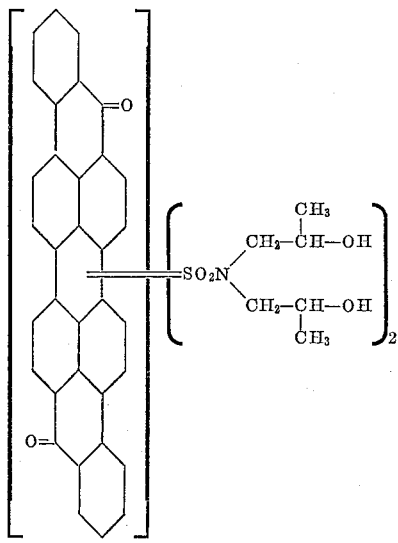

is obtained which dyes cellulose fibres similar tints.

*Example 4*

11.4 parts of isodibenzanthrone are dissolved in 210 parts of chlorosulfonic acid at 20 to 25° C. The solution is stirred for 2 hours at 80 to 85° C. It is then cautiously poured on to ice, and the precipitated sulfochloride is filtered off with suction and washed with ice-water. The moist filter cake is introduced into 200 parts of N-methylaniline at 0 to 5° C., while stirred well, and stirring is continued at that temperature for a further two hours, and then for 15 hours at room temperature. Finally, the whole is heated for one hour at 50 to 60° C. After being cooled to room temperature, the mixture is diluted with 800 parts of methanol, and the precipitate is filtered off and washed with methanol. The filter cake is stirred into about 1000 parts by volume of water, acidified with hydrochloric acid, filtered off, washed neutral with water, and finally dried.

The new vat dyestuff has the formula

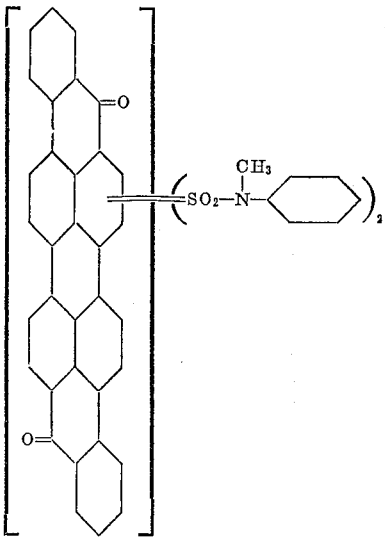

By the dyeing process described in Example 6, this dyestuff yields clear blue dyeings having excellent properties of fastness.

By using the same quantity of N-ethylaniline, instead of N-methylaniline, a very similar dyestuff is obtained.

By using the same quantity of dibenzanthrone, instead of isodibenzanthrone, dyestuffs are obtained that yield clear blue dyeings having excellent properties of fastness when used in the dyeing process given in Example 6.

*Example 5*

13 parts of dichloroisodibenzanthrone are dissolved in 210 parts of chlorosulfonic acid. The solution is stirred for 5 hours at 110 to 115° C. The mixture is then cautiously poured on to ice, the precipitated sulfochloride is filtered off and washed with ice-water. The moist filter cake is introduced into 500 parts by volume of morpholine at 0 to 20° C., while stirring well. The whole is then stirred for 15 hours at 50 to 60° C. The precipitate is then filtered off, and the filter cake is extracted at the boil twice, each time with 500 parts of an aqueous solution of pyridine of 30% strength, and finally the filter cake is thoroughly washed with hot water.

The new dyestuff has the probable formula

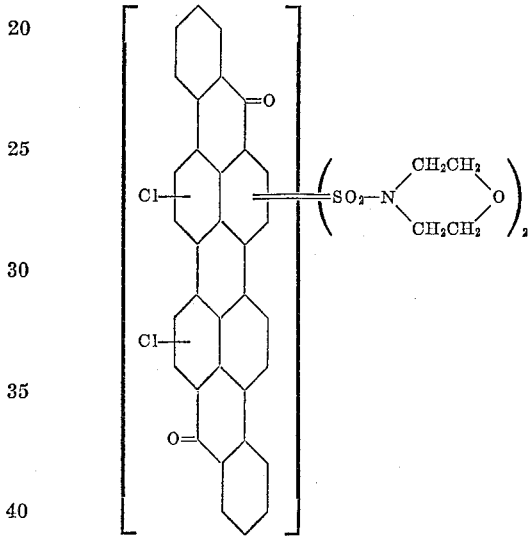

and yields full violet dyeings by the dyeing process described in Example 6.

*Example 6*

0.14 part of the dyestuff obtained as described in the third paragraph of Example 1, is vatted at 45° C. in 50 parts of water with the addition of 2.4 parts by volume of a solution of sodium hydroxide of 30% strength and 1.2 parts of sodium hydrosulphite. The vat stock so obtained is added to a solution of 0.3 part of sodium hydrosulphite in 350 parts of water. 10 parts of cotton are dyed for one hour in the dyebath so obtained at 40 to 50° C. with the addition of 8 parts of sodium chloride. The cotton is then squeezed, oxidized in the air, rinsed, acidified, rinsed again and finally soaped at the boil. The cotton is dyed with a strong navy blue tint, and the dyeing has a very good fastness to light and very good properties of wet fastness.

*Example 7*

0.15 part of the dyestuff obtained as described in the first paragraph of Example 1, is vatted in 50 parts of water at 60° C. with 1.2 parts of sodium hydrosulphite with the addition of 4 parts by volume of a solution of sodium hydroxide of 30% strength. The vat stock so obtained is added to a solution of 2 parts by volume of a solution of sodium hydroxide of 30% strength and 0.3 part of sodium hydrosulphite in 350 parts of water. 10 parts of cotton are dyed at 60° C. for one hour in the dye bath so obtained. The cotton is then squeezed, oxidized in the air, rinsed, acidified, rinsed again and finally soaped at the boil. The cotton is dyed a strong violet tint, and the dyeing has a very good fastness to light and very good properties of wet fastness.

What is claimed is:
1. A vat dyestuff fast to soda boiling selected from the groups consisting of the formulae

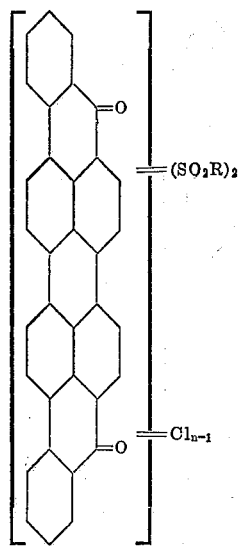

and

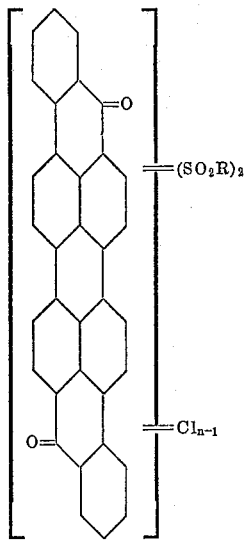

in which $n$ is a whole number of at most 3, R is a radical selected from the groups consisting of the formula

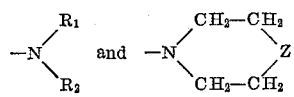

wherein $R_1$ represents a member selected from the group consisting of lower unsubstituted alkyl and lower hydroxyalkyl, $R_2$ a member selected from the group consisting of lower unsubstituted alkyl, lower hydroxyalkyl and phenyl, and Z a member selected from the group consisting of a direct bond, an oxygen atom, a sulfur atom, an N-unsubstituted lower alkyl group and a —$CH_2$-group.

2. The vat dyestuff of the formula

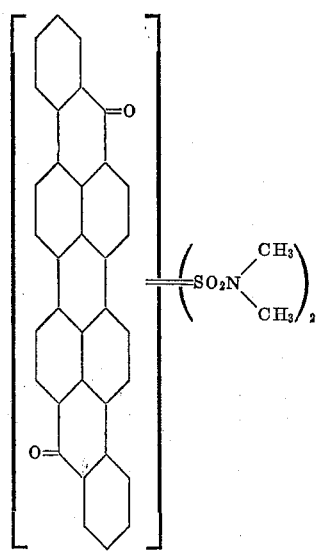

characterized by fastness to soda boiling.

3. The vat dyestuff of the formula

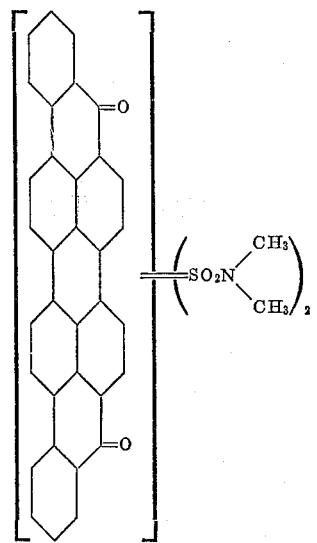

characterized by fastness to soda boiling.

4. The vat dyestuff of the formula

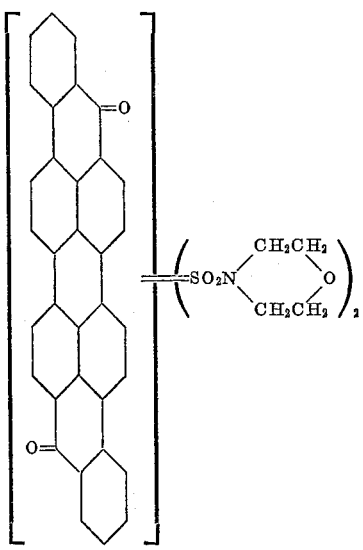

characterized by fastness to soda boiling.

5. The vat dyestuff of the formula
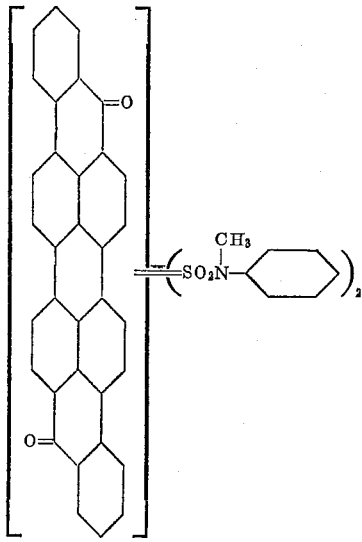
characterized by fastness to soda boiling.
6. The vat dyestuff of the formula
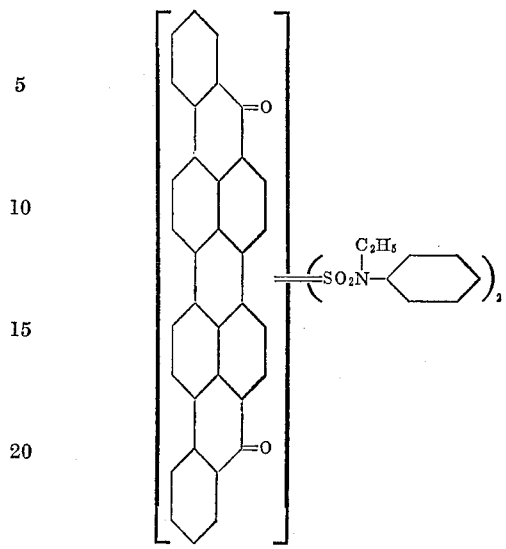
characterized by fastness to soda boiling.
References Cited in the file of this patent
UNITED STATES PATENTS
| | | |
|---|---|---|
| 2,979,503 | Armento et al. | Apr. 11, 1961 |
| 3,027,369 | Hardy et al. | Mar. 27, 1962 |
| 3,073,849 | Fleysher | Jan. 15, 1963 |
FOREIGN PATENTS
| | | |
|---|---|---|
| 515,330 | Germany | Jan. 2, 1931 |
| 807,224 | Great Britain | Jan. 14, 1959 |